(12) United States Patent
Murmann et al.

(10) Patent No.: US 8,290,031 B1
(45) Date of Patent: Oct. 16, 2012

(54) ARRANGEMENTS AND METHODS FOR PROVIDING COMPENSATION FOR NON-IDEALITIES OF COMPONENTS IN COMMUNICATIONS SYSTEMS

(75) Inventors: Boris Murmann, Palo Alto, CA (US); Yangjin Oh, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1293 days.

(21) Appl. No.: 11/838,566

(22) Filed: Aug. 14, 2007

Related U.S. Application Data (60) Provisional application No. 60/837,476, filed on Aug. 14, 2006.

(51) Int. Cl.
- H04B 3/46 (2006.01)
- H04B 17/00 (2006.01)
- H04Q 1/20 (2006.01)

(52) U.S. Cl. ........ 375/224; 375/285; 370/241; 370/491; 370/500

(58) Field of Classification Search .................. 375/224, 375/285, 346, 340; 370/241, 252, 491, 500
See application file for complete search history.

(56) References Cited

U.S. PATENT DOCUMENTS

| | | | | |
|---|---|---|---|---|
| 3,470,480 A * | 9/1969 | Smart et al. | ................ | 455/237.1 |
| 3,758,881 A * | 9/1973 | Rummler | ........................ | 333/16 |
| 4,746,881 A * | 5/1988 | Suzuki et al. | ................... | 333/16 |
| 4,994,767 A * | 2/1991 | Hawkes | ........................ | 332/123 |
| 5,495,506 A * | 2/1996 | Shoji | ............................ | 375/344 |
| 5,691,727 A * | 11/1997 | Cyzs | ............................. | 342/361 |
| 5,734,972 A * | 3/1998 | Hayashino et al. | ........ | 455/182.2 |
| 5,745,159 A * | 4/1998 | Wax et al. | ........................ | 725/76 |
| 5,809,083 A * | 9/1998 | Wright | ........................... | 375/285 |
| 5,838,728 A * | 11/1998 | Alamouti et al. | ............. | 375/265 |
| 6,088,324 A * | 7/2000 | Sato | ................................ | 370/203 |
| 6,956,815 B2 * | 10/2005 | Chiodini | ........................ | 370/210 |
| 7,091,894 B2 * | 8/2006 | Fudge et al. | ................... | 341/155 |
| 7,149,485 B2 * | 12/2006 | Busson et al. | ............. | 455/183.1 |
| 7,173,991 B2 * | 2/2007 | Scarpa | ........................... | 375/350 |
| 7,283,074 B2 * | 10/2007 | Sheng et al. | ................... | 341/120 |
| 7,292,651 B2 * | 11/2007 | Li | ................................. | 375/316 |
| 7,319,424 B2 * | 1/2008 | Stewart | ........................ | 341/155 |
| 7,388,922 B2 * | 6/2008 | Yamagata | ..................... | 375/260 |
| 7,440,506 B2 * | 10/2008 | Atungsiri et al. | ............. | 375/260 |
| 7,551,677 B2 * | 6/2009 | Crawford | ...................... | 375/260 |
| 7,551,691 B2 * | 6/2009 | De Bart et al. | ................ | 375/326 |
| 7,577,214 B2 * | 8/2009 | Abe | ............................... | 375/326 |
| 7,580,466 B2 * | 8/2009 | Ido | ................................ | 375/260 |
| 7,668,246 B2 * | 2/2010 | Zhidkov et al. | ............... | 375/260 |
| 7,675,441 B2 * | 3/2010 | Sheng et al. | ................... | 341/120 |
| 7,830,970 B2 * | 11/2010 | De Bart et al. | ................ | 375/260 |
| 2003/0063678 A1 * | 4/2003 | Crawford | ...................... | 375/260 |
| 2004/0228272 A1 * | 11/2004 | Hasegawa et al. | ............ | 370/210 |
| 2005/0024083 A1 * | 2/2005 | Kitamura et al. | .............. | 326/21 |
| 2005/0141413 A1 * | 6/2005 | Hoshino | ........................ | 370/208 |
| 2006/0198449 A1 * | 9/2006 | De Bart et al. | ................ | 375/260 |
| 2007/0217546 A1 * | 9/2007 | Sandell et al. | ................ | 375/299 |
| 2010/0117878 A1 * | 5/2010 | Sheng et al. | ................... | 341/120 |

* cited by examiner

*Primary Examiner* — Jean B Corrielus
(74) *Attorney, Agent, or Firm* — Crawford Maunu PLLC

(57) ABSTRACT

For use in or as part of a communications system benefiting from compensation for one or more non-idealities of components in the communications system, aspects of the invention are directed to providing compensation for such non-idealities. An example method which is applicable in a system that receives a pilot signal having an expected amplitude, includes determining a received amplitude for the received pilot signal using at least one of the components of the communications system, and using feedback indicative of a comparison of the determined received amplitude and the expected amplitude, compensating for a non-ideality of the component.

6 Claims, 6 Drawing Sheets

ARRANGEMENTS AND METHODS FOR PROVIDING COMPENSATION FOR NON-IDEALITIES OF COMPONENTS IN COMMUNICATIONS SYSTEMS

RELATED PATENT DOCUMENTS

This patent document claims the benefit, under 35 U.S.C. §119(e), of U.S. Provisional Patent Application No. 60/837,476 filed on Aug. 14, 2006 and entitled: "Arrangements and Methods for Calibration of Circuit Non-Idealities in Communications Systems" and is fully incorporated herein by reference.

FIELD OF THE INVENTION

The present invention relates generally to communication arrangements and methods and, more particularly, to an arrangement and method addressing circuit non-idealities of components in communications systems.

BACKGROUND

With the recent shift towards digital information processing, low power and high throughput have a certain degree of importance in many modern communication systems. Aside from the demand for increasingly high throughput, the growing trend toward portable and wearable devices oftentimes limits the maximum energy consumption while maintaining affordability. Increases in the throughput of a device are often accomplished through increasing accuracy of the devices. Sometimes increases in accuracy are accomplished by complex and expensive designs. In this context, the demand for increasing the throughput can be at odds with demands for affordability and minimization of power requirements.

Increased accuracy of communications devices can sometimes be realized by precisely controlling the characteristics of components in the devices, such as semiconductor and passive component characteristics. The control of such characteristics, however, can be expensive. Moreover, in certain applications the level of desired control may not be possible using conventional component construction methods. Thus, such conventional devices can be designed to compensate for the mismatched components. Also, some traditional methods of compensation have required additional power consumption and can reduce the throughput of the communications devices.

Numerous components can affect the operation of a communications device. For example, the functionality of a communications device can be adversely affected by non-idealities of various passive components including, resistive, capacitive and inductive components. Likewise, non-idealities of active components, such as comparators, amplifiers, and various other semiconductor components, lead to problems in the operation of a communications device.

A specific example of a communications-type component with such non-idealities is an analog-to-digital converter (ADC). The capabilities of an ADC often determine a significant portion of the power consumption and affect the throughput of a communications device. One way to minimize conversion energy is to employ an inherently simple and efficient ADC architecture, such as a successive-approximation register (SAR) ADC based on passive charge redistribution. A time interleaved array of such devices built in modern 90-nm technology can achieve high speed while consuming only a fraction of the energy used in competing architectures. However, due to the parallelism involved in a time-interleaved approach, it can be desirable to cancel mismatch between the individual conversion channels.

Even though this form of converter architecture is more than two decades old, several aspects make it attractive for implementation in current and future technologies. First, due to their inherently simple structure and minimal analog complexity, SAR ADCs are known to exhibit excellent power efficiency. Secondly, their performance is expected to scale well with feature size reduction and tends to be fairly insensitive to the otherwise detrimental impact of supply voltage reduction and decreasing intrinsic device gain in deep submicron CMOS.

Despite these advantages, SAR ADCs come with a significant penalty in conversion speed. Since the digital output is resolved sequentially, the achievable conversion speed is fairly low causing potential problems with many wireless systems. For example, a wireless communication device implementing orthogonal-frequency-division multiplexing (OFDM) based ultra wideband (UWB) system may require ADCs with 6-bit resolution and throughput rates of approximately 500 MS/s. These performance requirements are hard to meet using a generic SAR ADC.

Time interleaving is a known method for increasing throughput in an ADC, SAR or otherwise. A time-interleaved array employs several ADCs that process the incoming signal sequentially. Ideally, the overall throughput of a time-interleaved ADC increases linearly with the number of interleaved channels, and the bit-resolution of the array is equal to the bit-resolution of the individual sub-ADCs. In practice, however, time interleaving can cause severe performance degradation due to mismatches between individual channels. Typically, at least three types of mismatches are considered: mismatch in gain, offset and timing. In addition, the nonlinearity of each channel and mismatch thereof can be an issue.

Offset mismatch between the different ADC channels, mostly due to random comparator offset, can also be an issue in such design. Assuming a basic differential pair input structure in the comparator, the offset is mainly determined by threshold mismatches in the input pair, where the standard deviation of threshold mismatch is inversely proportional to the square root of transistor area.

This issue can be addressed to some extent by increasing the device area. However, to reduce the offset by 10 times in a given environment, a one hundred-fold increase in area would be necessary. Assuming constant current density and minimum channel length to preserve speed, this would also correspond to a 100-times increase in comparator power dissipation. Another option is to employ analog auto-zero and offset cancellation techniques. While such schemes may have been attempted, they usually require additional timing overhead and sufficient device gain, which also translates into a power penalty for a given target performance.

Similar issues exist for other ADC configurations as well as other digital and analog circuits and their components. These and other characteristics present challenges to the implementation of communication arrangements, such as wireless communications arrangements.

SUMMARY

The present invention is directed to communication systems, arrangements and methods and, more particularly, to the design and operation of such apparatus relative to addressing circuit non-idealities of components therein. The present invention is exemplified in a number of implementations and applications, some of which are summarized below.

According to a specific example embodiment involving a communications system, the present invention is directed to a method for providing compensation for one or more non-idealities of components in the communications system. The method includes receiving a pilot signal having an expected amplitude, determining a received amplitude for the received pilot signal using at least one of the components of the communications system, providing a feedback signal responsive to a comparison of the determined received amplitude and the expected amplitude, and using the feedback signal, compensating for a non-ideality of the component.

According to another specific example embodiment involving a wireless communications system, the present invention is directed to one or more circuit arrangements in the system and providing compensation for one or more non-idealities of components in the circuit arrangement(s). Each such circuit arrangement includes a receiver, a processor circuit, and a feedback circuit. The processor circuit provides an amplitude signal corresponding to an amplitude for a received pilot signal. Also, the processor circuit contains at least one of the components of the communications system. The feedback circuit provides a feedback signal that is responsive to a comparison of the amplitude signal and an expected amplitude, where the feedback signal is used to compensate for a non-ideality of the component and where the feedback signal can be determined as a polynomial approximation of a difference between the determined amplitude and the expected amplitude.

Various more-specific embodiments involve further technical aspects. In connection with the above method, for example, the step of filtering the pilot signal can be prior to the step of providing a feedback signal, and the step of determining the amplitude for the pilot signal can use a fast Fourier transform (FFT) algorithm having a number of FFT bins determined by a communications protocol. Further, more specific implementations of the above systems and methods use orthogonal-frequency-division multiplexing and a time-interleaved analog-to-digital converter (ADC).

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention is believed to be applicable to a variety of communications arrangements and approaches for implementing the same. While the present invention is not necessarily limited to such applications, an appreciation of various aspects of the invention is best gained through a discussion of examples in such an environment.

According to one example embodiment, a communications device is arranged to compensate for non-idealities (such as offsets) of one or more components of the communications device. The device receives signals that are predetermined by the communications protocol, such as synchronization signals, and uses the received signals to compensate for such component non-idealities. The device includes a filter that removes noise from the signal. The filtered signal is processed using the components and compared against the predetermined or expected signal. The comparison is used to generate a feedback signal that is used to compensate for differences between the processed signal and the expected signal.

Another example embodiment is directed to a method for compensating for offsets of one or more components of the communications device. A received signal having known signal qualities (e.g., a pilot signal) is processed using at least one of the components. The processed signal is compared against an expected value based upon the known signal qualities. In one instance, the filtering uses a low-pass filter designed to remove noise from the processed signal while not removing offsets due to the components. A feedback signal is produced based upon the comparison between the expected value and the known value.

In a more specific example, the components are part of an ADC or similar signal processing circuit. The components may be passive, such as resistive and capacitive elements, or they may be active components, such as transistors or more complicated circuits (ultimately, even digital signal-processing circuits are constructed from analog components). Accordingly, all types of signal-processing circuits are subject to problems due to non-idealities of components that are similar to the problems exhibited by analog circuits.

In certain instances, the received signal contains a number of parallel signals that can be separated based upon time, frequency or the like. One such method uses a fast-Fourier-transform (FFT) algorithm to simplify the isolation of frequency components contained within the signal using FFT bins.

The system is designed to use signals that are processed by (or known to) both the receiver and transmitter, such as pilot signals. Such signals are used for signal detection and receiver-to-transmitter synchronization to compensate for the effects of frequency offsets and phase noise, which are often present in wireless communications. Accordingly, such signals are used by many communication protocols.

While various embodiments of the present invention are discussed in relation to ADC offsets, the discussions are not meant to be limited to ADC offsets. Instead, the present invention is intended to cover a variety of digital and analog circuits and non-idealities of their components. For example, ADC circuits are constructed from various analog components, as digital circuits are ultimately constructed using analog components, and the non-idealities of ADC circuit components often result in mismatches between the components, analog or otherwise. Various other non-ADC circuits suffer from similar offsets, such as mismatches between amplification or filter circuits. Accordingly, the various embodiments directed to ADC offsets are readily amenable to other analog and digital circuits and devices.

In a particular embodiment of the present invention, the communication devices use wireless communications; however, the invention can also be implemented for wired communication systems, such as various network communication protocols including, but not limited to, Digital Subscriber Line (DSL).

Figure 1:
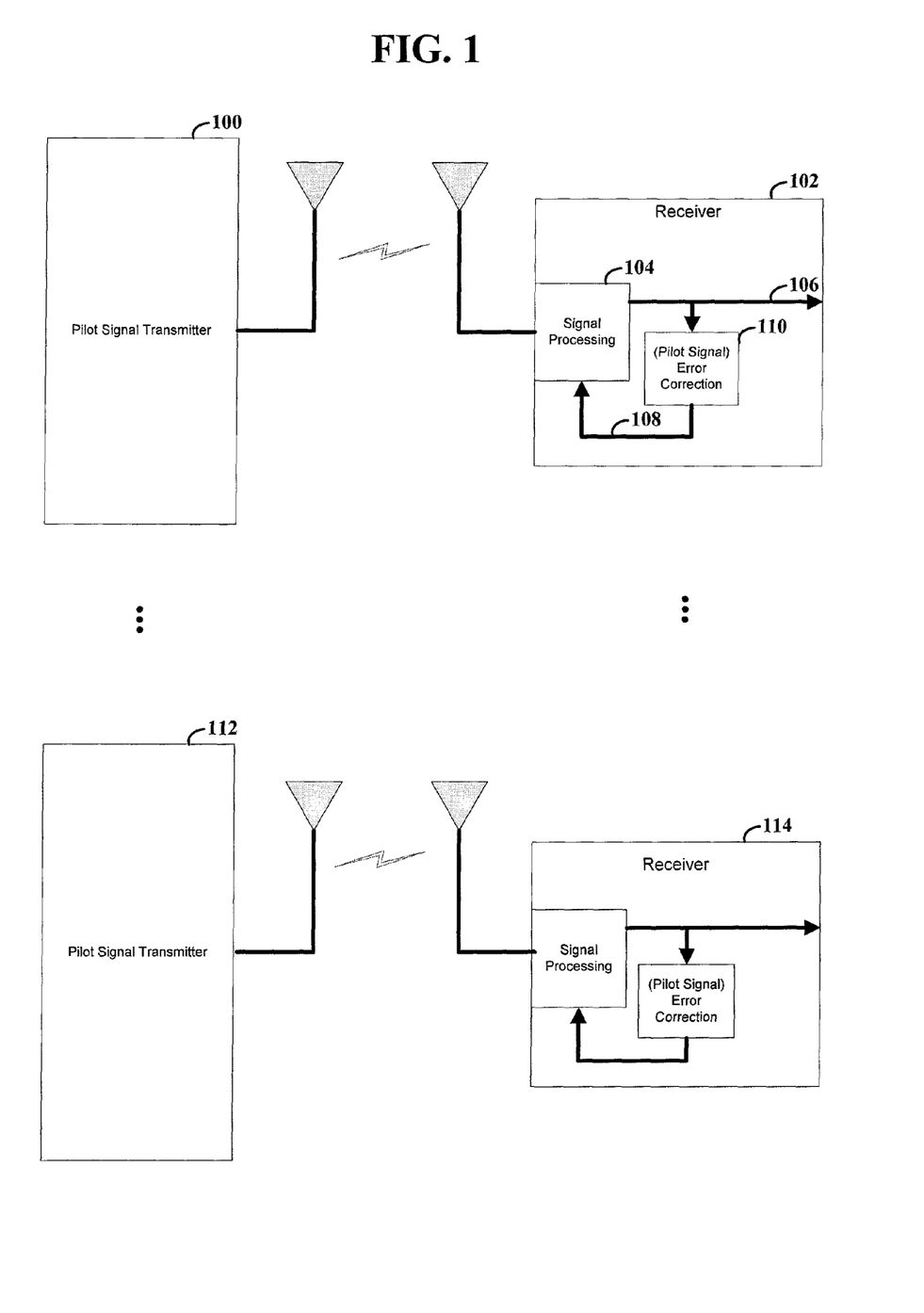
FIG. 1 shows a diagram of a communication system, according to an example embodiment of the present system.

Turning now to the figures, FIG. 1 shows a diagram of a communication system, according to an example embodiment of the present system. The figure shows transmitters 100 and 112 and receivers 102 and 114. In some instances, the devices may be both a transmitter and a receiver (i.e., a transceiver); however, for simplicity, the terms transmitter and receiver are used herein and are not meant to be limiting.

Transmitters 100 and 112 transmit a signal to one or more receivers 102 and 114, which receive the transmitted signal. The received signal is processed by signal processing block 104 to produce signal 106. Signal 106 represents the data transmitted by transmitters 100 and 112. If processing block 104 is not calibrated correctly due to component non-idealities (e.g., component mismatches, thermal variances or other factors), signal 106 will be affected by the component non-idealities. If the non-idealities are great enough, data derived from signal 106 may be corrupted. To compensate for the non-idealities, error correction block 110 produces feedback signal 108. Feedback signal 108 is derived by comparing the received value of signal 106 to the expected value of signal 106. For signals for which the data is not predetermined, the signal value is not known at the receiver. Thus, the feedback signal is derived from pilot signals for which the expected signal is known the receiver.

In one instance, error correction block 110 determines offsets corresponding to several components in processing block 104. The offsets may correspond to any number of circuits, digital or otherwise. For example, error correction block 110 may determine an offset for each ADC in a time-interleaved ADC. In another instance, error correction block 110 determines the offset by averaging the calculated offsets over time. This can be particularly useful for tracking changes in component offsets due to temperature and for avoiding unwanted feedback due to noise.

In a particular embodiment of the present invention, processing block 104 uses a FFT algorithm. The size of the FFT is relevant to the number of ADCs in the time-interleaved ADC. For instance, mismatches between ADCs produce erroneous values in FFT bins corresponding to an integer multiple of the number of ADCs. Thus, the number of ADCs can be selected as a function of the number of FFT bins. In a particular instance, the number of ADCs is chosen to be a prime number with respect to the number of FFT bins so as to assure that the offset error appears in each bin, and thus, will correspond to one or more pilot signals.

In one embodiment, the components of receiver 102 and 114 can be constructed using one or more general purpose digital signal processors (that are programmed accordingly), programmable logic devices and discrete logic. For example, the signal processing block 104 and error correction block 110 may be implemented using a digital signal processor that contains ADCs to convert the received signal. Additionally, analog components may be necessary to amplify or otherwise modify the signal for use by the digital signal processor. The digital signal processor is then programmed to perform the error estimation methods defined herein to determine component non-idealities (e.g., non-idealities of the ADCs or analog components) and to provide any error correction necessary to signal 106.

Accordingly, in a circuit arrangement for providing compensation for one or more non-idealities of components in the communications system, the circuit arrangement includes a receiver (e.g., an RF signal receiver in the case of a wireless communications system) for receiving a pilot signal having an expected amplitude, a signal processor (e.g., a programmable-microcomputer circuit board or a discrete components as discussed herein) for determining an amplitude for the pilot signal using at least one of the components of the communications system, and a feedback circuit for providing a feedback signal responsive to a comparison of the determined amplitude and the expected amplitude and for compensating for a non-ideality of the component using the feedback signal. The feedback circuit can be more specifically implemented, e.g., in the form of an error-correcting comparator that produces a signal indicative of an error between the received value of the signal and the expected value of the signal or, for signals for which the data is not predetermined, in the form of a signal processor (as a software or hardware module) that uses pilot signals for which the expected signal is known.

Figure 2:
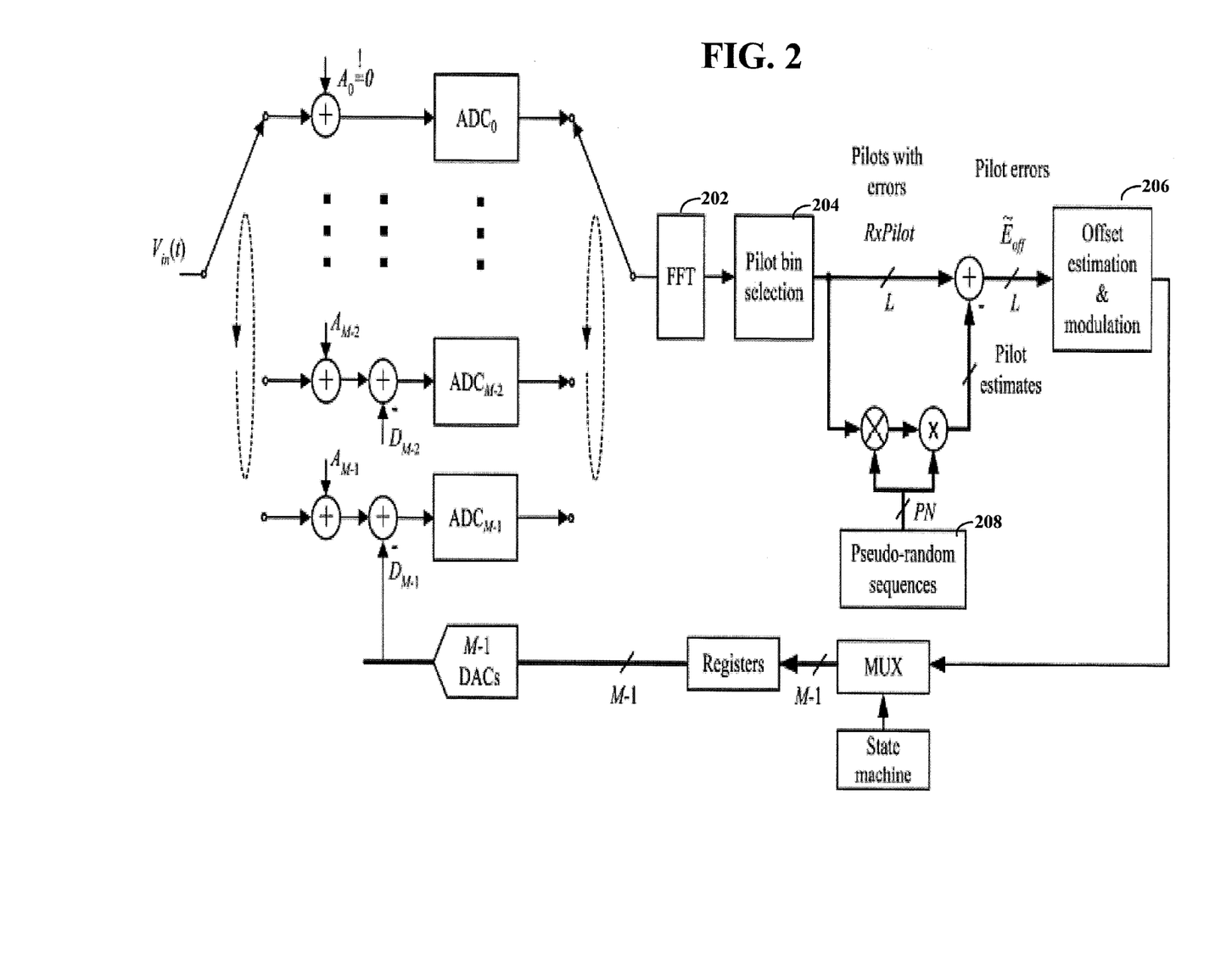
FIG. 2 shows a block diagram of a receiver device, according to another example embodiment of the present invention.

FIG. 2 shows a block diagram of a receiver device, according to another example embodiment of the present invention. The receiver device can be implemented using a number of different approaches. For example, various general purpose digital signal processors include timer-interleaved ADCs and provide programming capabilities that can be used to implement one or more functional aspects shown in FIG. 2. In another instance, a specialized circuit can be constructed using discrete logic, one or more programmable logic devices, general or specialized signal processors, and any combination thereof.

In one embodiment, $ADC_0$ to $ADC_{M-1}$ convert the received signal into a digital representation in a time-interleaved manner. FFT block 202 implements a FFT algorithm on the signals received from $ADC_0$ to $ADC_{M-1}$. Pilot bin selection block 204 selects the FFT bins corresponding to the pilot signals. Pseudo-random sequence block 208 provides a signal corresponding to the expected FFT bin value for the pilot signal. This signal is used to determine the current pilot estimate. In one instance, the current pilot estimate signal is modified by a filter, such as the low pass filter shown in FIG. 3. The current pilot estimate signal is used to determine the current estimated offset error by subtracting the pilot estimate signal from the FFT bin value for the pilot signal. Offset estimation block 206 uses the current estimated offset error to determine the feedback signal. In one example, estimation block 206 determines the feedback signal by averaging the received estimated offset errors and iteratively adjusting the feedback signal to reduce the offset error.

A specific embodiment of the present invention is implemented for an OFDM receiver using an SAR ADC to process the received signal. A system embedded calibration scheme, has some relevant communication signal attributes. OFDM employs frequency multiplexing to transport the data in a parallel manner, i.e., the serial input data is parallelized to generate multiple sub-channels. The signals in each sub-channel are modulated with uniformly spaced frequencies and subsequently summed in the time domain. Even if the transmitted signal is subjected to interference from other signals in the channel, the data in different sub-channels will not interfere with each other due to their frequency domain orthogonality. This modulation scheme can be equivalently implemented using an IFFT in the digital domain.

The demodulation in the receiver is performed using the inverse signal flow by employing an FFT to recover the data. The data is organized in basic units of frames, where a frame contains multiple data in the frequency domain, called OFDM tones or sub-carriers. The number of tones in a frame is identical to the number of serial data that are parallelized in the serial-to-parallel converter. This number also corresponds to the sizes of the IFFT and FFT needed in the transmitter and receiver. In a UWB OFDM system, the size of one frame is 128. Within each frame, several pilot tones are generated from a known sequence of data symbols. These tones are used for robust coherent detection in the presence of frequency offsets and phase noise and can be considered redundant, since they do not contain any user information.

In a typical communication channel, each tone can experience a different attenuation but would not leak into adjacent frequency bins. The calibration approach described below uses this isolation of the redundant pilot tones to estimate and cancel ADC nonlinearity due to offsets in the interleaved array.

In a time-interleaved ADC, offsets between individual channels generate periodic signals at the converter output. Assuming that the FFT size is an integer multiple of the number of interleaved ADCs, the periodic offset sequence will be seen as discrete tones in a few isolated FFT bins. For example, when the FFT size is 128 and the number of ADCs is 8, the offset errors produce tones only in the frequency bins located at 128/8=16 and its multiples, 32, 48, etc. In principle, if some of these bins coincided with the pilot bins of the OFDM system, the offsets are detectable as uncorrelated excess power in the pilot.

Unfortunately, the pilot tone frequencies are usually standardized and cannot be changed. In order to observe offset errors in the pilot bins regardless of their location, the number of ADCs is selected to be a mutually prime number with respect to the FFT size to spread the offset error signals spread out over the entire frequency spectrum. For example, if the FFT size is 128 the ADC may have 7 channels with random offset mismatch.

The goal of the calibration is to correct the individual ADC offsets such that the induced errors in all frequency bins become zero. FIG. 2 shows a block diagram of one proposed solution. The following discussion assumes that the ADC offsets ($A_m$) are removed via a set of DACs that superimpose a digitally controlled correction ($D_m$) to the SAR ADC comparators. Thus, sub-LSB precision can be obtained without increasing the bit-resolution of the digital receiver backend.

For simplicity, it is assumed that the analog offset correction is applied with 'infinite' resolution. In practice, the step size of the correction DACs should be chosen such that it does not significantly deteriorate the idealized outcome presented below. Typically, simple 3-5-bit DACs will suffice, since the required correction range spans only a few LSB. Note that without loss of generality, the offset of the first unit ADC ($A_0$) is set to zero. With this simplifying definition, the goal of the calibration becomes to determine all offset adjustments such that $D_m = A_m$ for all m=1 ... M-1.

The individual offset corrections can be estimated from the FFT output. As previously discussed, the signals in the pilot bins consist of two components: the actual pilots and superimposed errors due to ADC offsets. As shown in FIG. 2, the error component is calculated by subtracting the expected pilot signal from the total bin content. For this operation, precise knowledge of the pilot amplitude is expected. Unfortunately, the communication channel alters the amplitude of the pilot tones in a time-varying manner and also superimposes random noise. Accordingly, a statistics based method can be implemented to provide pilot amplitude estimation with sufficient precision and continuous tracking capability.

In the standardized UWB OFDM communication protocol, the polarities of the pilot tones are modulated by known pseudo-random sequences to prevent the generation of constant sub-carriers in the channel. With the knowledge of the modulation sequence, the amplitude of each pilot tone can be estimated using a correlation-based approach.

Each transmitted pilot tone (TxPilot) and received pilot tone (RxPilot) can be expressed as: TxPilot=PN·PilotDatum; RxPilot=G·PN·PilotDatum+Eoff+W$_{noise}$; where PilotDatum is the (fixed) pilot tone datum, PN is a pseudo-random sequence, G is the channel gain, W$_{noise}$ is white channel noise, and E$_{off}$ is the error due to ADC offset mismatches. The pilot amplitudes are estimated by finding the correlation between the received pilot tone and the pseudo-random sequence PN $$RxPilot \otimes PN = G \cdot PilotDatum \cdot PN \otimes PN +$$
$$E_{off} \otimes PN + W_{noise} \otimes PN$$
$$= G \cdot PilotDatum,$$

where represents a correlation operator that yields the average value of the multiplied outcomes.

Figure 3:
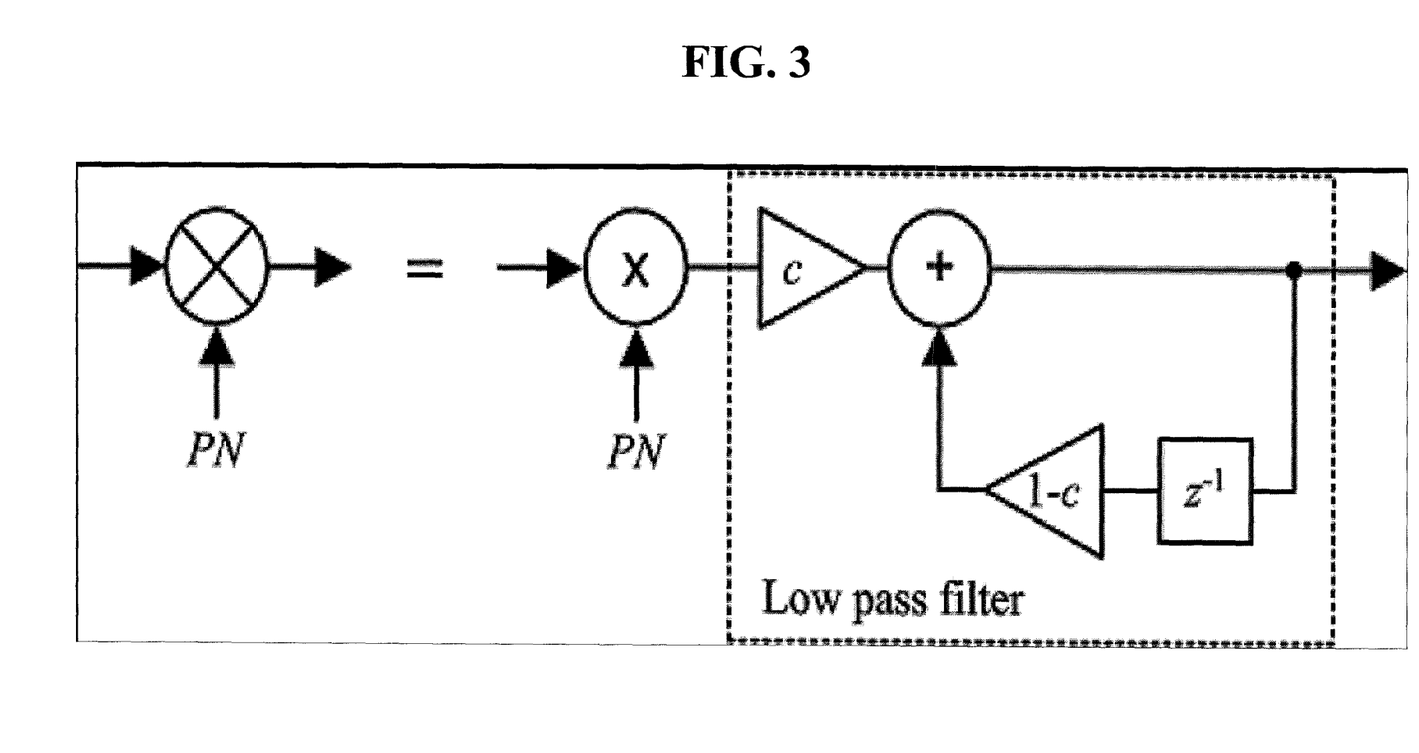
FIG. 3 shows a block diagram of a low pass filter, according to another example embodiment of the present invention.

FIG. 3 shows a possible implementation for this correlation operator using a multiplier and low pass filter combination. The filter is designed to track (slow) variations in pilot tone amplitude, while sufficiently rejecting white channel noise. For instance, the filter parameter c can be set to 0.01.

The errors in the pilot bins due to ADC offset mismatches are now estimated using $\tilde{E}_{off}$=RxPilot−PN·G·PilotDatum, where $\tilde{E}_{off}$ represents an estimate of $E_{off}$ that is corrupted by the white noise in the system ($E_{off} - \tilde{E}_{off} = W_{noise}$). In a practical implementation, this estimate must be further averaged over a large number of samples to reduce the impact of W$_{noise}$.

In principle, the required correction, $D_m$, can be directly calculated from the errors $E_{off}$ in the individual pilot bins. The pilot bin errors due to offset mismatch, $E_{off}[k_0]$, $E_{off}[k_1]$, $E_{off}[k_2]$, ... $E_{off}[k_{L-1}]$ are related to the individual ADC offsets $A_1, A_2, \ldots, A_{M-1}$, as $$\begin{pmatrix} E_{off}[k_0] \\ E_{off}[k_1] \\ \vdots \\ E_{off}[k_{L-1}] \end{pmatrix} = \begin{pmatrix} p_{(1)}^{k_0} & p_{(2)}^{k_0} & \cdots & p_{(M-1)}^{k_0} \\ p_{(1)}^{k_1} & p_{(2)}^{k_1} & \cdots & p_{(M-1)}^{k_1} \\ \vdots & \vdots & & \vdots \\ p_{(1)}^{k_{L-1}} & p_{(2)}^{k_{L-1}} & \cdots & p_{(M-1)}^{k_{L-1}} \end{pmatrix} \begin{pmatrix} A_1 \\ A_2 \\ \vdots \\ A_{M-1} \end{pmatrix}$$

and $$p_{(i)}^k = \frac{1}{\sqrt{N}} \left( e^{-j\frac{2\pi}{N}(0+i)\cdot k} + e^{-j\frac{2\pi}{N}(M+i)\cdot k} + e^{-j\frac{2\pi}{N}(2M+i)\cdot k} + \ldots + e^{-j\frac{2\pi}{N}(\lfloor \frac{N}{M} \rfloor-1)M+i)\cdot k} \right),$$

where M is the number of interleaved ADCs, L is the number of pilot tones within the frame, and N is the FFT size. Provided that there are at least as many pilots as interleaved ADCs (L≧M−1), the system is directly solvable using matrix manipulations. Even though this is the case in the subject design (L=12, M=7), the matrix manipulations could require a prohibitively high number of multiplications and additions (approximately 4·(M−1)·L and 2·(M−1)·(L−1), respectively).

For a practical implementation also in accordance with an embodiment of the present invention, an iterative algorithm avoids extensive computation.

For the mean square errors in pilot tones, another aspect of the present invention is directed to a method for finding $D_m$ with fewer computations. Defining the total effective ADC offsets as $\alpha_m = A_m - D_m$, the sum of the squared pilot errors $P_{E,pilots}$ is given by $$P_{E,pilots} = \sum_i |E_{\text{off}}[k_i]|^2$$

$$= \sum_i \left\{ |a_1|^2 \cdot |p_{(1)}^{k_i}|^2 + \ldots + |a_{M-1}|^2 \cdot |p_{(M-1)}^{k_i}|^2 + \right.$$

$$\left. 2 \cdot \text{Re}\left(a_1 p_{(1)}^{k_i} \cdot \overline{a_2 p_{(2)}^{k_i}} + \ldots + a_{M-2} p_{(M-2)}^{k_i} \cdot \overline{a_{M-1} p_{(M-1)}^{k_i}}\right) \right\} \ldots$$

The mean square error is minimized for $\alpha_m = 0$, or equivalently $D_m = A_m$. Finding the optimum adjustment values is therefore equivalent to an optimization problem that aims to minimize the error function of $P_{E,pilots}$.

Figure 5:
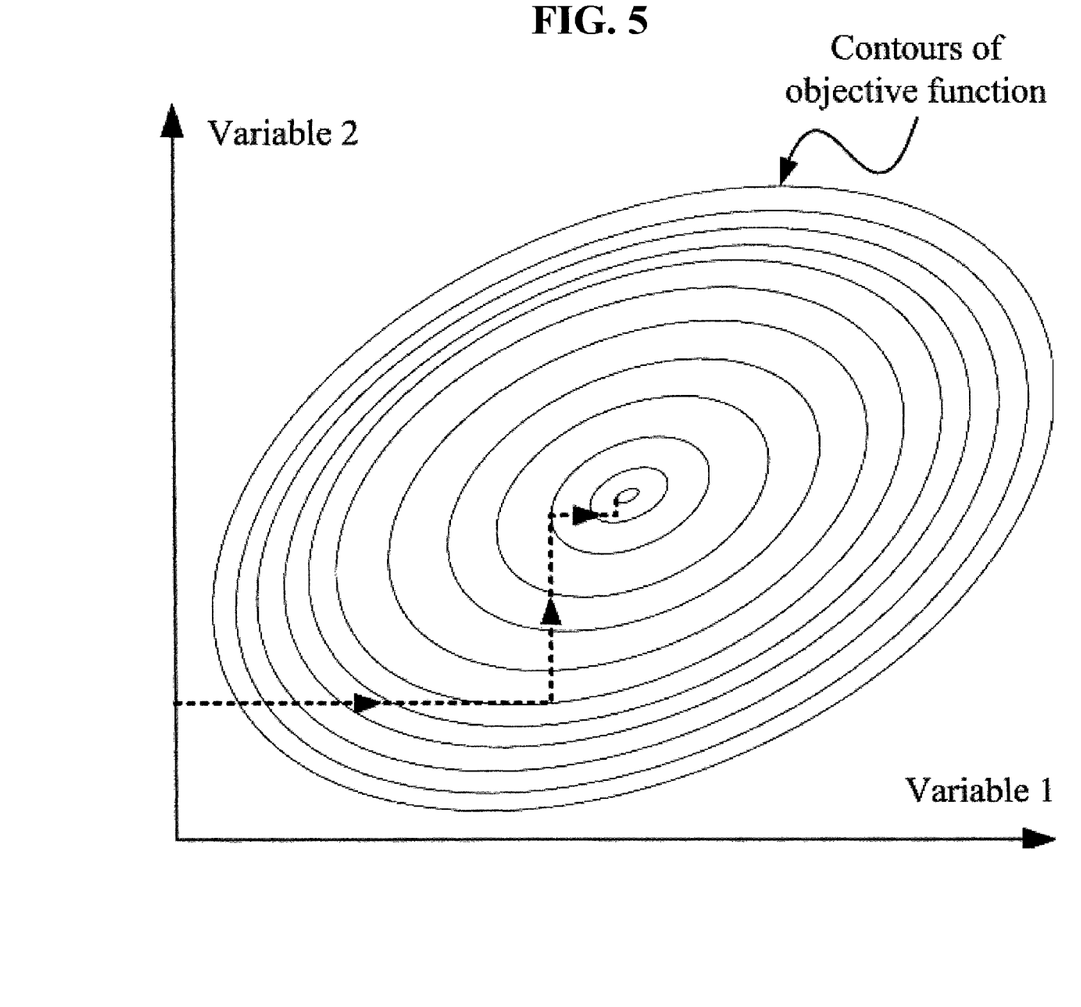
FIG. 5 shows a graphical representation of a coordinate descend method, according to another example embodiment of the present invention.

The variables $\alpha_m$ form $2^{nd}$ order polynomial functions with positive coefficients in the $2^{nd}$ order terms. Therefore, $P_{E,pilots}$ is a convex function in $\alpha_m$, and is therefore also convex in terms of the applied correction $D_m$. In an unconstrained convex problem of this kind, the optimum value for each variable can be determined in a straightforward manner. Cyclic iterations that optimize each variable individually will converge to the globally optimum solution. In each iteration, one target variable is optimized while all other variables are kept constant. This procedure, which may be referred to as coordinate descend method, is graphically illustrated in FIG. 5 for a two-variable example.

Figure 6:
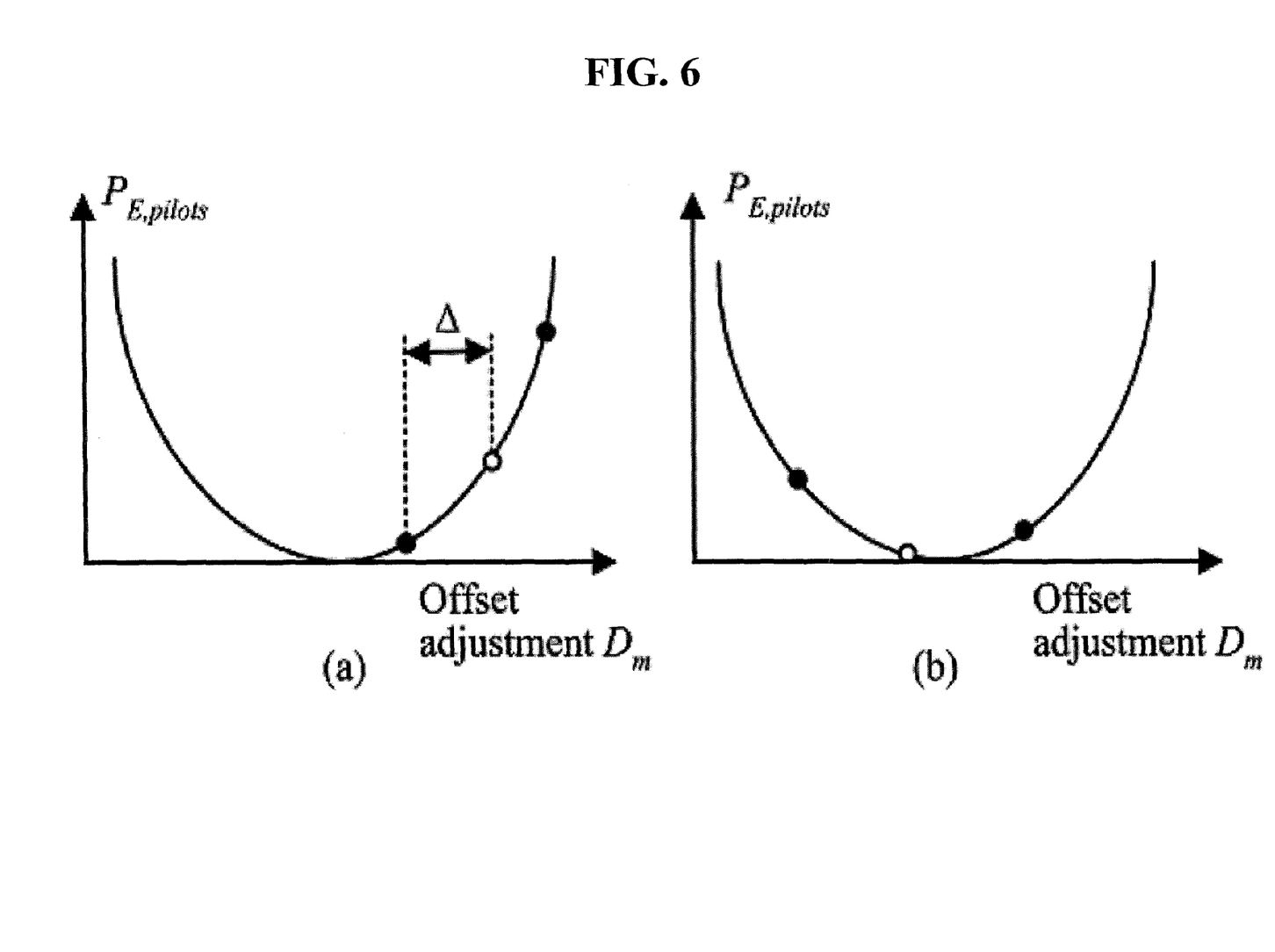
FIG. 6 shows a representation of an iterative offset adjustment, according to another example embodiment of the present invention.

To find the local optima in each iteration, Sweeping $D_m$ over a certain range provides a simple approach for finding a solution without complex calculations, and yields a quadratic error curve as shown in FIG. 6. From such a measurement, an optimum correction value that gives the minimum error in the current iteration is readily determined.

In one particular embodiment, a gradient-based search is used, which avoids the speed penalty of a full sweep over the entire range. In searching for the optimal point in a convex problem, measuring the gradient at one point per iteration is sufficient, as is done in a least-means-squared (LMS) algorithm. However, the LMS algorithm is not readily and directly applicable, since the gradient of the pilot tone errors is not directly accessible. Instead, the errors of two offset adjustments are compared to obtain a direction toward the optimum. As shown in FIG. 6(a), two tentative offset adjustment points are selected, one towards the negative side and one towards the positive side of the current adjustment. The tentative adjustment point that is closer to the optimum is then selected for the next iteration. When the optimum adjustment is centered between the chosen tentative points (FIG. 6(b)), it is possible that both alternatives have larger errors than the current adjustment. To guarantee a non-increasing error in each iteration, the current offset point is also considered as a candidate for the next adjustment.

The distance $\Delta$ from the current adjustment to the tentative adjustment point (FIG. 6) bounds the attainable precision of the calibration. For relatively good precision and fast convergence (for many applications), an adaptive $\Delta$ is desirable. With fixed $\Delta$, the entire calibration space will be searched with uniform resolution similar to a simple sweep. In the one example algorithm, $\Delta$ is varied depending on how close the optimum point is to the current adjustment. When one of the two tentative adjustments has a smaller error than the current adjustment (FIG. 6(a)) the optimum is considered to be far away from the current adjustment, and $\Delta$ is increased for the next measurement. On the other hand, when the current offset adjustment gives a smaller error than the tentative adjustments (FIG. 6(b)), $\Delta$ is reduced. Therefore, as the offset adjustment point nears its optimum, the precision increases, allowing for a small residual mean square error.

Figure 4:
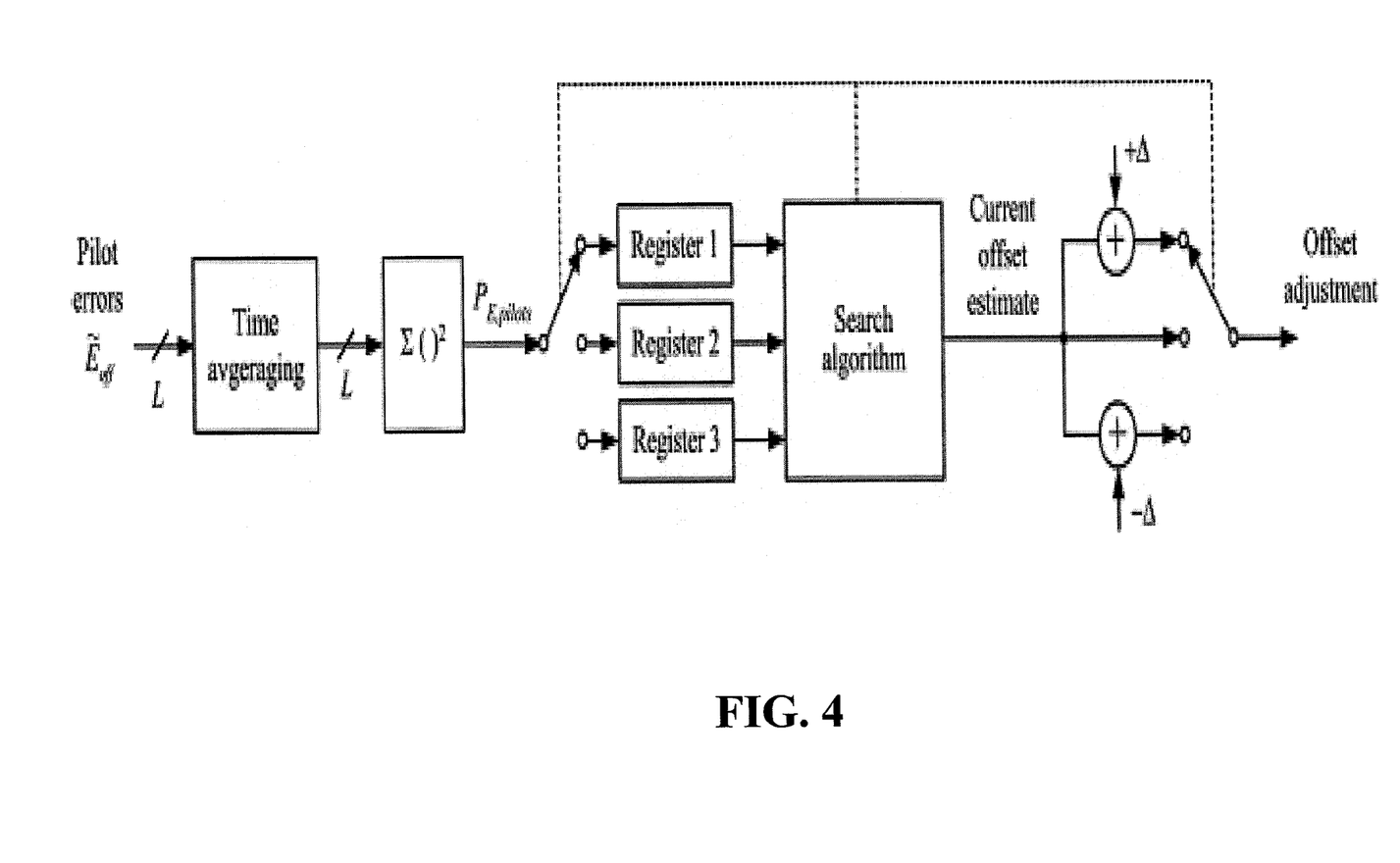
FIG. 4 shows a block diagram of an offset adjustment circuit, according to another example embodiment of the present invention.

FIG. 4 illustrates a more detailed block diagram of the ADC offset estimation and modulation block in FIG. 2. Only one unit ADC is connected to the offset estimation block at a time to allow for the above-described coordinate descend optimization. The algorithm cycles through the remaining ADCs sequentially, until the calibration converges to its global optimum.

Several noise sources in the system, including white thermal noise and interferences from the communication channel and RF front-end, set a limit on the minimum detectable pilot tone errors, and thereby limit the precision of the offset adjustments ($D_m$). In general, the correlation based measurement makes it possible to extract the terms correlated with the ADC offset mismatch and more or less reject other noise sources.

By Parseval's theorem, the noise power in the time domain is equal to the noise power in the frequency domain. Assuming a white noise spectrum, the total noise power in the pilot bins is given by $P_{n,pilots} = P_{noise} \cdot L/N$, where $P_{noise}$ is the channel's total noise power and L and N are the number of pilot tones and the FFT size, respectively. For the particular parameters of an UWB OFDM system, this noise leads to a net standard deviation in the offset adjustments of $\sigma_{D_m} \cong 0.13 \sqrt{P_{noise}}$.

The error estimate from the pilot bins can be filtered through a time averaging block as indicated in FIG. 4; this can help to reduce the effect of this noise. When K samples are averaged, $\sigma_{D_m}$ decreases by a factor of $\sqrt{K}$. For example, in a channel with SNR=20 dB ($P_{noise} \cong (6.4 \text{ LSB})^2$ at 6-bit resolution), averaging 100 samples leads to $\sigma_{D_m} = 0.083$ LSB, which will only mildly impact the SNDR of the converter.

An additional noise source arises from signal clipping. Clipping at the input of the ADC produces a nonlinear error that represents an additional Gaussian noise component with zero mean. Furthermore, clipping reduces the effective gain of the channel. Assuming a saturation amplitude of $A_{sat}$ and an average signal power of $\sigma^2$, the effective gain $\alpha_0$ and equivalent Gaussian noise $\sigma^2_C$ due to clipping are given by $$\alpha_0 \cong \left(1 - e^{-\left(\sqrt{A_{sat}^2/\sigma^2}\right)}\right) + \frac{1}{2}\sqrt{\pi \frac{A_{sat}^2}{\sigma^2}} \cdot \text{erfc}\left(\sqrt{\frac{A_{sat}^2}{\sigma^2}}\right) \text{ and,}$$

$$\sigma_C^2 = N\sigma^2 \cdot \left(1 - e^{-\left(\sqrt{A_{sat}^2/\sigma^2}\right)} - \alpha_0^2\right).$$

The term $\alpha_0$ does not affect the calibration since it can be viewed as a global gain error within the channel. For a typical clipping ratio of 3 ($A_{sat}/\square = 3$), the effective noise contribution due to $\sigma^2_C$ is approximately −0.72 dBFS, and can therefore be considered as only a minor addition to the overall noise in the channel.

Another potential issue is interference from other devices in the communication channel or from harmonic distortion in the RF front-end. Since the overall system requirement dictates very stringent linearity specs, the latter component is not expected to be an issue. Even if residual spurs due to RF nonlinearities are present, the random modulation and averaging of the algorithm will further attenuate these.

Out-of-band interference is attenuated more than 30 dB by a frequency select filter and will therefore not be an issue. In addition to this, in-band interference is avoided by dynamically turning tones ON/OFF, which essentially places strong and narrowband interference from other wireless devices (e.g. 802.11abg) out-of band. Assuming that a minimum separation between devices is maintained, typical interferers are sufficiently well modeled by including them as another additive Gaussian noise contributor.

In terms of interference, an important worst case to consider is a condition in which the receiver wakes up with an un-calibrated ADC, and still needs to establish handshake and synchronization within the system. In particular, for the ADC calibration to converge, the pseudo-random modulation of the pilots must first be synchronized with the transmitter. Fortunately, the modulation sequence can be synchronized with a strong immunity to noise and interference. Typically, the synchronization will be successful even at very low SNR levels on the order of 0 dB, and would not be affected by degradation from an un-calibrated ADC. The same conclusion also applies to frequency synchronization within the system. A low resolution (un-calibrated) ADC suffices to properly allocate frequency bands and to establish handshaking in the network, so that the interferers will ultimately migrate out of band as assumed above.

Issues due to a time varying channel are yet another non-ideality. For simplicity, it is implicitly assumed that the communication channel does not vary within a symbol frame. This approximation is valid since the frame interval in an UWB system is only 312.5 ns. This is short enough to make the channel quasi-stationary, even for relatively fast time variations. To show this, the following upper bound for inter-carrier interference power $$P_{ICI} \leq \frac{1}{12}(2\pi \cdot f_d T_s)^2$$

can be considered where $f_d$ is the Doppler frequency and $T_s$ is the symbol interval. For UWB, it follows that a moving object with a speed of 200 km/h can cause $P_{ICI}$ of only −66 dBc. In addition to that, the typical operation range of UWB is less than 10 m, and its application is not intended for fast moving devices.

The dominant overhead in power dissipation stems from the analog power dissipated in the calibration DACs, assuming that the offset corrections ($D_m$) are applied using simple current steering DACs that sink offset currents into the comparators. The required digital calibration components require very little additional power, as they operate on the FFT result at the fairly low rate of 500 MHz divided by the FFT size.

In the following derivation, N is the system's FFT size, M is the number of interleaved ADCs, and L is the number of pilot tones. For simplicity, this derivation is limited to the case where only one ADC in the interleaved array has an offset with unity amplitude. If the FFT size is an integer multiple of number of ADCs, the FFT of mismatch errors $E_{off}[k]$ is given by $$E_{off}[k] = \frac{1}{\sqrt{N}}\left(e^{-j2\pi\frac{k}{N}M\cdot 0} + e^{-j2\pi\frac{k}{N}M\cdot 1} + e^{-j2\pi\frac{k}{N}M\cdot 2} + \ldots + e^{-j2\pi\frac{k}{N}M\cdot \lfloor\frac{N}{M}\rfloor-1]}\right)$$

$$= \frac{1}{\sqrt{N}}\sum_{r=0}^{\lfloor\frac{N}{M}\rfloor-1} e^{-j2\pi\frac{k}{N}M\cdot r},$$

where $k \in \{1 \ldots N\}$ is a frequency bin index variable. For all frequency bins k that are integer multiples of N/M:

$$E_{off}[k] = \frac{1}{\sqrt{N}}\sum_{r=0}^{\lfloor\frac{N}{M}\rfloor-1} e^{-j2\pi\frac{k}{N}M\cdot r} = \frac{1}{\sqrt{N}}\sum_{r=0}^{\lfloor\frac{N}{M}\rfloor-1} 1^r = \frac{\sqrt{N}}{M}.$$

For frequency bins k that are not integer multiples of N/M:

$$E_{off}[k] = \frac{1}{\sqrt{N}}\sum_{r=0}^{\lfloor\frac{N}{M}\rfloor-1} e^{-j2\pi\frac{k}{N}M\cdot r} = \frac{1}{\sqrt{N}}\frac{1 - e^{-j2\pi\frac{k}{N}M\lfloor\frac{N}{M}\rfloor}}{1 - e^{-j2\pi\frac{k}{N}M}}$$

$$= \frac{1}{\sqrt{N}}\frac{1 - (1)^{-k}}{1 - e^{-j2\pi\frac{k}{N}M}} = 0.$$

Therefore, offset errors are non-zero only for the frequency bins that are integer multiples of N/M.

In the following derivation, the offset mismatches of the $m^{th}$ ADC is denoted by $A_m$, and the error signal in the frequency bin k is denoted by $E_{off}[k]$. $E_{off}[k]$ can be expressed as $$E_{off}[k] = \frac{A_1}{\sqrt{N}}\left(e^{-j\frac{2\pi}{N}(0+1)\cdot k} + e^{-j\frac{2\pi}{N}(M+1)\cdot k} + e^{-j\frac{2\pi}{N}(2M+1)\cdot k} + \ldots\right) +$$

$$\frac{A_2}{\sqrt{N}}\left(e^{-j\frac{2\pi}{N}(0+2)\cdot k} + e^{-j\frac{2\pi}{N}(M+2)\cdot k} + e^{-j\frac{2\pi}{N}(2M+2)\cdot k} + \ldots\right) + \ldots +$$

$$\frac{A_{M-1}}{\sqrt{N}}\left(e^{-j\frac{2\pi}{N}(0+M-1)\cdot k} + e^{-j\frac{2\pi}{N}(M+M-1)\cdot k} + \ldots\right).$$

Now let $$p_{(i)}^k = \frac{1}{\sqrt{N}}\left(e^{-j\frac{2\pi}{N}(0+i)\cdot k} + e^{-j\frac{2\pi}{N}(M+i)\cdot k} + e^{-j\frac{2\pi}{N}(2M+i)\cdot k} + \ldots + e^{-j\frac{2\pi}{N}((\lfloor\frac{N}{M}\rfloor-1)M+i)\cdot k}\right).$$

Substituting obtains: $E_{off}[k] = A_1 p_{(1)}^k + A_2 p_{(2)}^k + \ldots + A_{M-1} p_{(M-1)}^k$.

Thermal noise in the pilot bins generates a residual error in the calibration. Neglecting quantization effects in the following approximate analysis, this noise can be thought of as a result of an equivalent offset adjustment error $D_{m,err} = D_m - A_m$. For simplicity, it can be assumed that the noise from all pilot bins affects a particular $D_{m,err}$. In this case, the total pilot tone error power caused by $D_{m,err}$ should be equal to $P_{n,pilots} = P_{noise} \cdot L/N$. Mathematically, the error in a single pilot bin can be expressed from $D_{m,err}$ as $$|\tilde{E}_{off}[k]| = \frac{D_{m,err}}{\sqrt{N}}\left|e^{-j\frac{2\pi 0 M}{N}k} + e^{-j\frac{2\pi 1 M}{N}k} + e^{-j\frac{2\pi 2 M}{N}k} + \ldots\right|,$$

where k is the particular location of the pilot bin within the spectrum. The total error power in the pilots is therefore equal to $$|\tilde{E}_{off}[k_0]|^2 + |\tilde{E}_{off}[k_1]|^2 + \ldots + |\tilde{E}_{off}[k_L]|^2 =$$
$$\frac{D_{m,err}^2}{N}(|e^{-j2\pi 0M \cdot k_0/N} + e^{-j2\pi 1M \cdot k_0/N} + \ldots|^2 + \ldots +$$
$$|e^{-j2\pi 0M \cdot k_1/N} + e^{-j2\pi 1M \cdot k_1/N} + \ldots|^2) \cong 5.5 \cdot D_{m,err}^2,$$

where the last equality follows from the particular parameters of this implementation and the OFDM UWB standard (L=12, M=7, N=128, k={5, 15, ...}). The expected value of this error power can be approximated by the white noise power in the pilots $$E(|\tilde{E}_{off}[k_0]|^2 + \ldots + |\tilde{E}_{off}[k_L]|^2) \cong P_{n,pilots} = P_{noise} \cdot \frac{L}{N}.$$

The final result follows by $E(D_{m,err}^2)=\sigma_{D_{m,err}}^2$.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, various applications and functions described herein can be implemented using various approaches; thus, the blocks described in connection with FIGS. 1-4 can be implemented using, for example, general purpose processors, specially-designed processors, digital signal processors, software implementations, programmable logic devices, discrete logic and any combination thereof. Further, applications other than ADC offset compensation may be amenable to implementation using similar approaches. In addition, one or more of the above example embodiments and implementations may be implemented with a variety of approaches, including various analog and digital signal processing approaches, as well as those described in connection with the references cited below.

Various example embodiments are also directed to one or more of the approaches described in the underlying provisional-application Appendix entitled "System Embedded ADC Calibration for OFDM Receivers;" alone and/or in combination with other example embodiments discussed above which form part of this patent document.

These approaches are implemented in connection with various example embodiments of the present invention. Such modifications and changes do not depart from the true scope of the present invention, including that set forth in the following claims.

What is claimed is:

1. For use in a communications system, a method for providing compensation for one or more non-idealities of components in the communications system, the method comprising:
    receiving a pilot signal having an expected amplitude;
    using a fast Fourier transform (FFT) algorithm having a number of FFT bins determined by a communications protocol, determining a received amplitude for the received pilot signal using at least one of the components of the communications system;
    determining a feedback signal by determining a polynomial approximation of a difference between the determined amplitude and the expected amplitude, the polynomial approximation being adjusted using an averaging of subsequent comparisons of the determined amplitude and the expected amplitude.

2. For use in a communications system, a method for providing compensation for one or more non-idealities of components in the communications system, the method comprising:
    receiving a pilot signal having an expected amplitude;
    using a fast Fourier transform (FFT) algorithm having a number of FFT bins determined by a communications protocol, determining a received amplitude for the received pilot signal using at least one of the components of the communications system;
    determining a feedback signal as a polynomial approximation of a difference between the determined amplitude and the expected amplitude, the polynomial approximation being adjusted using an averaging of subsequent comparisons of the determined amplitude and the expected amplitude; and
    using the feedback signal, compensating for a non-ideality of the component.

3. For use in a wireless communications system, a circuit arrangement for providing compensation for one or more non-idealities of components in the communications system, the circuit arrangement comprising:
    a receiver configured to receive a pilot signal;
    a processor circuit to provide an amplitude signal corresponding to an amplitude for the received pilot signal by using a fast Fourier transform (FFT) algorithm, the processor circuit containing at least one of the components of the communications system; and
    a feedback circuit to provide a feedback signal as a polynomial approximation of a difference between the determined amplitude and an expected amplitude of the received pilot signal, to compensate for a non-ideality of the component, and wherein the polynomial approximation is adjusted using an averaging of subsequent comparisons of the determined amplitude and the expected amplitude.

4. For use in an orthogonal-frequency-division multiplexing communications system, a method for providing compensation for one or more non-idealities of components in the communications system, the method comprising:
    receiving an analog pilot signal having an expected amplitude;
    in a time-interleaved analog-to-digital converter (ADC), converting the received pilot signal to a digital signal;
    in at least one of the components of the communications system, determining a received amplitude for the received pilot signal using a fast Fourier transform (FFT) algorithm having a number of FFT bins determined by a communications protocol;
    providing a feedback signal responsive to a comparison of the determined received amplitude and the expected amplitude; and
    compensating for a non-ideality of the component including using the feedback signal to modify the received pilot signal before converting the received pilot signal in the ADC.

5. For use in a communications system, a method for providing compensation for one or more non-idealities of components in the communications system, the method comprising:
    receiving a pilot signal having an expected amplitude;
    determining a received amplitude for the received pilot signal using at least one of the components of the communications system;

providing a feedback signal responsive to a comparison of the determined received amplitude and the expected amplitude;

using the feedback signal, compensating for a non-ideality of the component including using the feedback signal to modify the received pilot signal to provide a modified pilot signal; and in a time-interleaved analog-to-digital converter, converting the modified pilot signal to a digital signal.

6. For use in a wireless communications system, a circuit arrangement for providing compensation for one or more non-idealities of components in the communications system, the circuit arrangement comprising:

a receiver configured to receive a pilot signal;

a processor circuit to provide an amplitude signal corresponding to an amplitude for the received pilot signal, the processor circuit containing at least one of the components of the communications system;

a feedback circuit to provide a feedback signal that is responsive to a comparison of the amplitude signal and an expected amplitude of the received pilot signal, with the feedback signal to compensate for a non-ideality of the component; and wherein the processor circuit includes a time-interleaved analog-to-digital converter (ADC) circuit configured and arranged to modify the received pilot signal to generate a modified pilot signal, based upon the feedback signal, and convert the modified pilot signal to a digital signal.

* * * * *